US 11,855,477 B2

(12) United States Patent
Wan

(10) Patent No.: US 11,855,477 B2
(45) Date of Patent: Dec. 26, 2023

(54) METHOD, DEVICE FOR CHARGING CONTROL, WIRELESS CHARGING BASE AND STORAGE DEVICE

(71) Applicant: GUANGDONG OPPO MOBILE TELECOMMUNICATIONS CORP., LTD., Guangdong (CN)

(72) Inventor: Shiming Wan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 391 days.

(21) Appl. No.: 17/164,251

(22) Filed: Feb. 1, 2021

(65) Prior Publication Data

US 2021/0159717 A1 May 27, 2021

Related U.S. Application Data

(63) Continuation of application No. PCT/CN2019/094278, filed on Jul. 1, 2019.

(30) Foreign Application Priority Data

Aug. 2, 2018 (CN) .......................... 201810872521.4

(51) Int. Cl.
  *H02J 50/80* (2016.01)
  *H02J 7/02* (2016.01)
  (Continued)

(52) U.S. Cl.
  CPC .............. *H02J 7/02* (2013.01); *H02J 7/0013* (2013.01); *H02J 7/00045* (2020.01); *H02J 50/402* (2020.01); *H02J 50/80* (2016.02)

(58) Field of Classification Search
  CPC .................................................... H02J 50/80
  (Continued)

(56) References Cited

U.S. PATENT DOCUMENTS

2011/0130093 A1* 6/2011 Walley .................... H02J 50/12
                                                      307/104
2017/0149284 A1* 5/2017 Von Novak III .... A01K 27/003
(Continued)

FOREIGN PATENT DOCUMENTS

CN    101971452 A    2/2011
CN    106357011 A    1/2017
(Continued)

OTHER PUBLICATIONS

Chinese First office action with English Translation of Chinese application No. 201810872521.4, dated Jan. 2, 2020 (16 pages).
(Continued)

*Primary Examiner* — Edward Tso
*Assistant Examiner* — Ahmed H Omar
(74) *Attorney, Agent, or Firm* — Young Basile Hanlon & MacFarlane, P.C.

(57) ABSTRACT

A charging control method, a device, a storage medium and a wireless charging base are provided. The method can be applied to a wireless charging base comprising wireless charging units, each supporting a variety of wireless charging standards, and each wireless charging unit wirelessly charges for electronic devices. The method includes detecting whether the wireless charging base simultaneously wirelessly charging electronic devices, wherein each wireless charging unit supports a variety of wireless charging standards; in response to detecting that the wireless charging base simultaneously wirelessly charges the electronic devices, obtaining a first number of electronic devices and a second number of wireless charging standards supported by the wireless charging base; determining with each electronic device a wireless charging standard according to the first number and the second number; and wirelessly charging each electronic device through corresponding wireless
(Continued)

charging unit according to the wireless charging standard determined with each electronic device.

20 Claims, 6 Drawing Sheets

(51) Int. Cl.
  *H02J 7/00* (2006.01)
  *H02J 50/40* (2016.01)
(58) Field of Classification Search
  USPC .......................................... 320/108
  See application file for complete search history.

(56) References Cited

U.S. PATENT DOCUMENTS

| | | |
|---|---|---|
| 2018/0041065 A1 | 2/2018 | Vijayan et al. |
| 2018/0159359 A1 | 6/2018 | Park et al. |
| 2020/0021138 A1* | 1/2020 | Yeo .................... H02J 50/40 |

FOREIGN PATENT DOCUMENTS

| | | |
|---|---|---|
| CN | 106684953 A | 5/2017 |
| CN | 107134862 A | 9/2017 |
| CN | 109038727 A | 12/2018 |
| EP | 3337010 A1 | 6/2018 |

OTHER PUBLICATIONS

Chinese second office action with English Translation of Chinese application No. 201810872521.4, dated Apr. 28, 2020(7 pages).
Notification to Grant Patent Right for Invention with English Translation of Chinese application No. 201810872521.4, dated Jul. 28, 2020 (6 pages).
International Search Report with English Translation of International application No. PCT/CN2019/094278, dated Sep. 18, 2019 (16 pages).
Extended European Search Report for EP Application 19845144.5 dated Aug. 13, 2021. (8 pages).
Communication pursuant to Article 94(3) EPC for EP Application 19845144.5 dated Jun. 9, 2022. (6 pages).

* cited by examiner

METHOD, DEVICE FOR CHARGING CONTROL, WIRELESS CHARGING BASE AND STORAGE DEVICE

CROSS-REFERENCE TO RELATED APPLICATION(S)

The present disclosure is a continuation-application of International (PCT) Patent Application No. PCT/CN2019/094278 filed Jul. 1, 2019, which claims foreign priority of Chinese Patent Application No. 201810872521.4, filed on Aug. 2, 2018, the entire contents of all of which are hereby incorporated by reference.

TECHNICAL FIELD

The present disclosure relates to the field of wireless charging technology, and in particular, to a method and a device for charging control, a storage device and a wireless charging base.

BACKGROUND

With the continuous development of technology, there are more and more electronic devices using wireless charging. Wireless charging refers to the transmission of electrical energy through non-conductive materials. In practical applications, wireless charging usually refers to the transmission of electric energy through a certain space distance. There are four ways to realize wireless charging technology: electromagnetic induction, magnetic resonance, radio wave and electric coupling.

SUMMARY

The embodiments of the present disclosure provide a method and a device for charging control, a storage device and a wireless charging base.

A charging control method applied to a wireless charging base according to some embodiments of the present disclosure is provided. The charging control method is applied to a wireless charging base. The wireless charging base includes a plurality of wireless charging units, each wireless charging unit supports a variety of wireless charging standards, and each wireless charging unit wirelessly charges for electronic devices. The method includes: detecting whether the wireless charging base simultaneously wirelessly charging a plurality of electronic devices, wherein each wireless charging unit supports a variety of wireless charging standards; in response to detecting that the wireless charging base simultaneously wirelessly charges the plurality of electronic devices, obtaining a first number of electronic devices and a second number of wireless charging standards supported by the wireless charging base; determining with each electronic device a wireless charging standard for wireless charging each electronic device according to the first number and the second number; wirelessly charging each electronic device through corresponding wireless charging unit according to the wireless charging standard determined with each electronic device.

A charging control device applied to a wireless charging base according to some embodiments of the present disclosure is provided. The charging control device is applied to a wireless charging base. The wireless charging base includes a plurality of wireless charging units, each wireless charging unit supports a variety of wireless charging standards, and each wireless charging unit wireless charges for electronic devices. The device includes: a detection module configured to detect whether the wireless charging base simultaneously charging a plurality of electronic devices, wherein each wireless charging unit supports a variety of wireless charging standards; an acquisition module configured to obtain a first number of electronic devices and a second number of wireless charging standards supported by the wireless charging base, in response to detecting the wireless charging base simultaneously charging the plurality of electronic devices; a determination module configured to determine with each electronic device a wireless charging standard for wireless charging each electronic device according to the first number and the second number; and a control module configured to wirelessly charge each electronic device through corresponding wireless charging unit according to the wireless charging standard determined with each electronic device.

A wireless charging base according to some embodiments of the present disclosure is provided. The wireless charging base includes a non-transitory storage medium and a processor. The wireless charging base is applied to a wireless charging base. The wireless charging base includes a plurality of wireless charging units, each wireless charging unit supports a variety of wireless charging standards, and each wireless charging unit wireless charges for electronic devices. The processor is configured to use computer programs stored in the non-transitory storage medium to perform: detecting whether the wireless charging base simultaneously wirelessly charging a plurality of electronic devices, wherein each wireless charging unit supports a variety of wireless charging standards; in response to detecting that the wireless charging base simultaneously wirelessly charges the plurality of electronic devices, obtaining a first number of electronic devices and a second number of wireless charging standards supported by the wireless charging base; determining with each electronic device a wireless charging standard for wireless charging each electronic device according to the first number and the second number; and wirelessly charging each electronic device through corresponding wireless charging unit according to the wireless charging standard determined with each electronic device.

BRIEF DESCRIPTION OF DRAWINGS

The technical solution and beneficial effects of the present disclosure will be obvious through detailed description of the specific embodiments of the disclosure in combination with the attached drawings.

DETAILED DESCRIPTION

Figure 1:
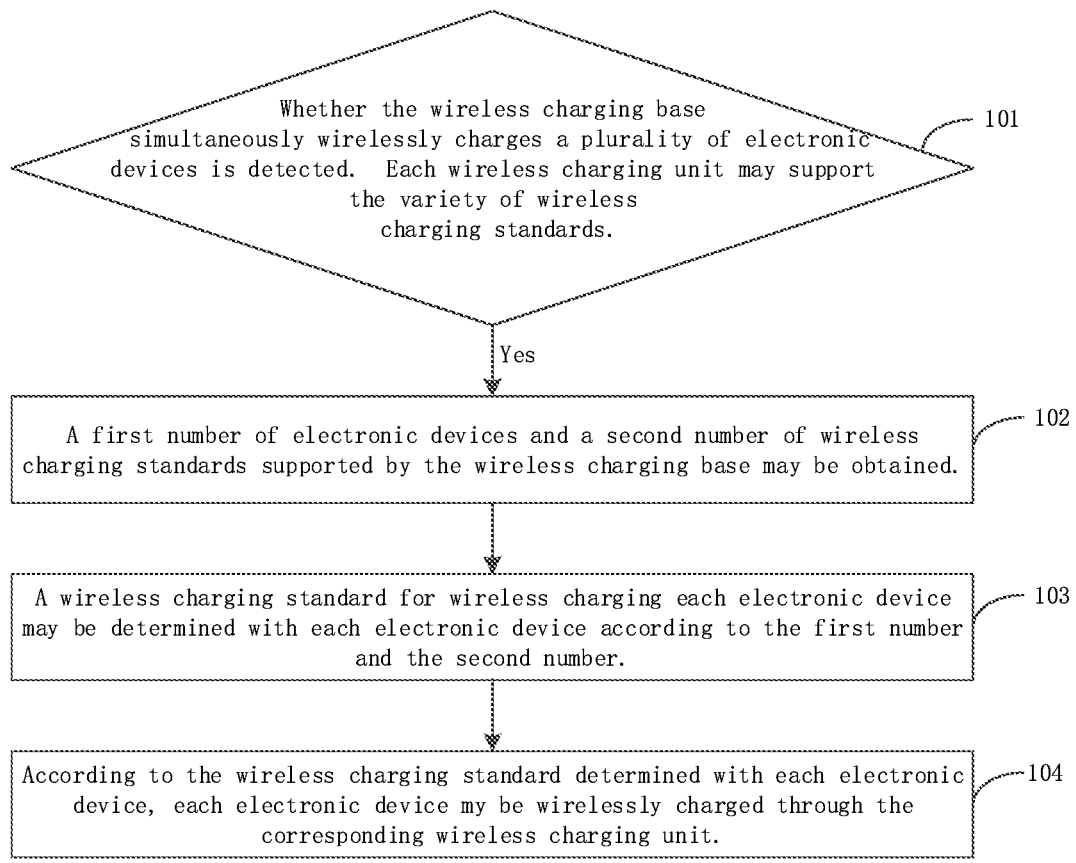
FIG. 1 is a flow chart of a charging control method according to some embodiments of the present disclosure.

Referring to the drawings, same reference numerals represent the same components, the principles of the present application are illustrated by the implementation in a suitable computing environment. The following description is based on the specific embodiments of the present disclosure as illustrated, and not intended to limit the present disclosure.

In the following description, specific embodiments of the present disclosure will be described with reference to the steps and symbols performed by one or more computers, unless otherwise stated. Therefore, these steps and operations will be mentioned several times to be performed by computers. "Being performed by computers" in the description includes operations of a computer processing unit representing an electronic signal of data in a structured form. The operations convert or maintain the data at a location in the non-transitory storage medium system of the computer. The operations may be reconfigured or otherwise alter the operations of the computer in a manner well known to those skilled in the art. The data structure maintained by the data is the entity location of the non-transitory storage medium. The data structure has specific characteristics defined by the data format. However, the principle of the present disclosure illustrated by the above words does not constitute a limitation. Those skilled in the art will understand that the following steps and operations can also be implemented in hardware.

The term "module" as used in the description can be regarded as a software object executed on the computing system. The different components, modules, engines and services described in the description can be regarded as implemented objects on the computing system. The device and method described herein can be implemented in the form of software or can be implemented on hardware, all of which are within the protection scope of the present disclosure.

The terms "first", "second" and "third" in the present disclosure are used to distinguish different objects, rather than to describe a specific order. In addition, the terms "comprise" and "include" and any variations of the two terms are intended to cover exclusive inclusion. For example, a process, method, system, product or device comprising a series of steps or modules is not limited to the listed steps or modules, but some embodiments also include steps or modules not listed, or some embodiments also include other steps or modules inherent to these processes, methods, products or devices.

Reference to "embodiments" herein means that specific features, structures or characteristics described the embodiments may be included in at least one embodiment of the present disclosure. The presence of the term in various places in the description does not necessarily refer to the same embodiment, nor is it an independent or alternative embodiment mutually exclusive with other embodiments. It is explicitly and implicitly understood by those skilled in the art that the embodiments described herein may be combined with other embodiments.

A charging control method of the present disclosure is provided. The charging control method is applied to a wireless charging base. The wireless charging base may include a plurality of wireless charging units. Each wireless charging unit supports a variety of wireless charging standards. Each wireless charging unit wirelessly charges for electronic devices. The method may include: detecting whether the wireless charging base simultaneously wirelessly charging a plurality of electronic devices, wherein each wireless charging unit supports a variety of wireless charging standards; in response to detecting that the wireless charging base simultaneously wirelessly charges the plurality of electronic devices, obtaining a first number of electronic devices and a second number of wireless charging standards supported by the wireless charging base; determining with each electronic device a wireless charging standard for wireless charging each electronic device according to the first number and the second number; and wirelessly charging each electronic device through corresponding wireless charging unit according to the wireless charging standard determined with each electronic device.

In some embodiments, determining with each electronic device the wireless charging standard for wireless charging each electronic device according to the first number and the second number may include: in response to the first number being less than or equal to the second number, determining with each electronic device a wireless charging standard for wireless charging each electronic device, wherein the wireless charging standard for wireless charging each electronic device determined with each electronic device is different from another.

In some embodiments, the wireless charging units on the wireless charging base are distributed in matrix form.

Determining with each electronic device the wireless charging standard for wireless charging each electronic device according to the first number and the second number may include: in response to the first number being greater than the second number, determining with each electronic device the wireless charging standard for wireless charging each electronic device, wherein the electronic devices placed on the horizontally adjacent wireless charging units or longitudinally adjacent wireless charging units use different wireless charging standards.

In some embodiments, the wireless charging base may include a wireless communication unit.

Determining with each electronic device the wireless charging standard for wireless charging each electronic device comprises determining the wireless charging standard for wireless charging each electronic device through the wireless communication unit with each electronic device.

In some embodiments, after wirelessly charging each electronic device through corresponding wireless charging unit according to the wireless charging standard determined with each electronic device, the method may further include: in response to detecting a decrease in the number of the electronic devices placed on the wireless charging base for charging, obtaining a third number of target electronic devices currently placed on the wireless charging base for charging; in response to the third number being less than or equal to the second number, determining with each target electronic device the wireless charging standard for wireless charging each target electronic device, wherein the wireless charging standard for wireless charging each target electronic device determined with each target electronic device is different from another.

In some embodiments, the method may further include: in response to the third number being greater than the second number, maintaining the wireless charging standard used by each target electronic device.

In some embodiments, the wireless communication unit may include a Bluetooth communication unit or an NFC communication unit.

Please referring to FIG. 1, FIG. 1 is a flow chart of a charging control method according to some embodiments of the present disclosure. The wireless charging method can be applied to a wireless charging base. The wireless charging base may include a plurality of wireless charging units. Each wireless charging unit may support a variety of wireless charging standards, and each wireless charging unit can charge electronic devices wirelessly.

The flow of the charging control method provided by the embodiment may include operations at blocks.

At block 101, whether the wireless charging base simultaneously wirelessly charges a plurality of electronic devices is detected. Each wireless charging unit may support the variety of wireless charging standards.

With the continuous development of technology, there may be more and more electronic devices using wireless charging. Wireless charging refers to the transmission of electrical energy through non-conductive materials. In practical applications, wireless charging usually refers to the transmission of electric energy through a certain space distance. There may be four ways to realize wireless charging technology: electromagnetic induction, magnetic resonance, radio wave and electric coupling. However, among the related technologies, the wireless charging base may have poor flexibility when charging electronic devices wirelessly.

In the present embodiment, the wireless charging base can detect whether wireless charging is required for the plurality of (at least two) electronic devices at the same time. The electronic device provided by the embodiments can support a variety of wireless charging standards. Moreover, each wireless charging unit in the wireless charging base provided by the embodiments may also support a variety of wireless charging standards.

In response to detecting that the wireless charging base is currently wirelessly charging only one electronic device, the wireless charging base can perform other operations.

In response to detecting that the wireless charging base currently needs to simultaneously charge at least two electronic devices, enter the operations at block 102.

At block 102, in response to detecting that the wireless charging base simultaneously wirelessly charges the plurality of electronic devices, a first number of electronic devices and a second number of wireless charging standards supported by the wireless charging base may be obtained.

For example, in response to the wireless charging base detecting that the plurality of electronic devices are currently needed to be wirelessly charge at the same time, the wireless charging base can be triggered to obtain the number of electronic devices placed on the wireless charging base for charging, that is, the first number. Moreover, the wireless charging base can also obtain the number of wireless charging standards supported by the wireless charging base, that is, the second number.

For example, in the present embodiment, the wireless charging base may detect that two electronic devices are currently needed to be wirelessly charged at the same time. Besides, the wireless charging base may support two wireless charging standards. That is, the first number may be two, and the second number may be two.

It should be noted that in the embodiment, the number of wireless charging standards supported by each wireless charging unit may be equal to the number of wireless charging standards supported by the wireless charging base.

For example, in response to the wireless charging base supporting two wireless charging standards, each wireless charging unit may also support two wireless charging standards.

At block 103, a wireless charging standard for wireless charging each electronic device may be determined with each electronic device according to the first number and the second number.

For example, after obtaining the first number of electronic devices placed on the wireless charging base for charging and the second number of wireless charging standards supported by the wireless charging base, the wireless charging base can determine wireless charging standards with each electronic device placed on the wireless charging base for wireless charging according to the first number and the second number.

At block 104, according to the wireless charging standard determined with each electronic device, each electronic device may be wirelessly charged through the corresponding wireless charging unit.

For example, after determining wireless charging standards with each electronic device placed on the wireless charging base for wireless charging, the wireless charging base can charge each electronic device through the corresponding wireless charging unit according to the wireless charging standard determined with each electronic device.

For example, the user may place the electronic devices A and B on the wireless charging unit of the wireless charging base for charging. Each wireless charging unit on the wireless charging base may support two wireless charging standards, such as Qi standard (WPC standard) and PMA standard. That is, the first number and the second number may be both 2. Then, according to the first number and the second number, the wireless charging base can determine the wireless charging standard for wireless charging with the electronic device A, and determine the wireless charging standard for wireless charging with the electronic device B. For example, the wireless charging base determines to use Qi standard for wireless charging of electronic device A and PMA standard for wireless charging of electronic device B. After that, the wireless charging base can charge the electronic device according to Qi standard, and charge electronic device B according to PMA standard.

It can be understood that in the embodiment, when wireless charging is required for the plurality of electronic devices at the same time, the wireless charging base can obtain the first number of electronic devices and the second number of wireless charging standards supported by the wireless charging base. After that, the wireless charging base can determine the wireless charging standard for wireless charging with each electronic device according to the first number and the second number, and wirelessly charge each electronic device according to the determined wireless charging standard. Therefore, the embodiment can improve the flexibility of wireless charging base for electronic devices.

Figure 2:
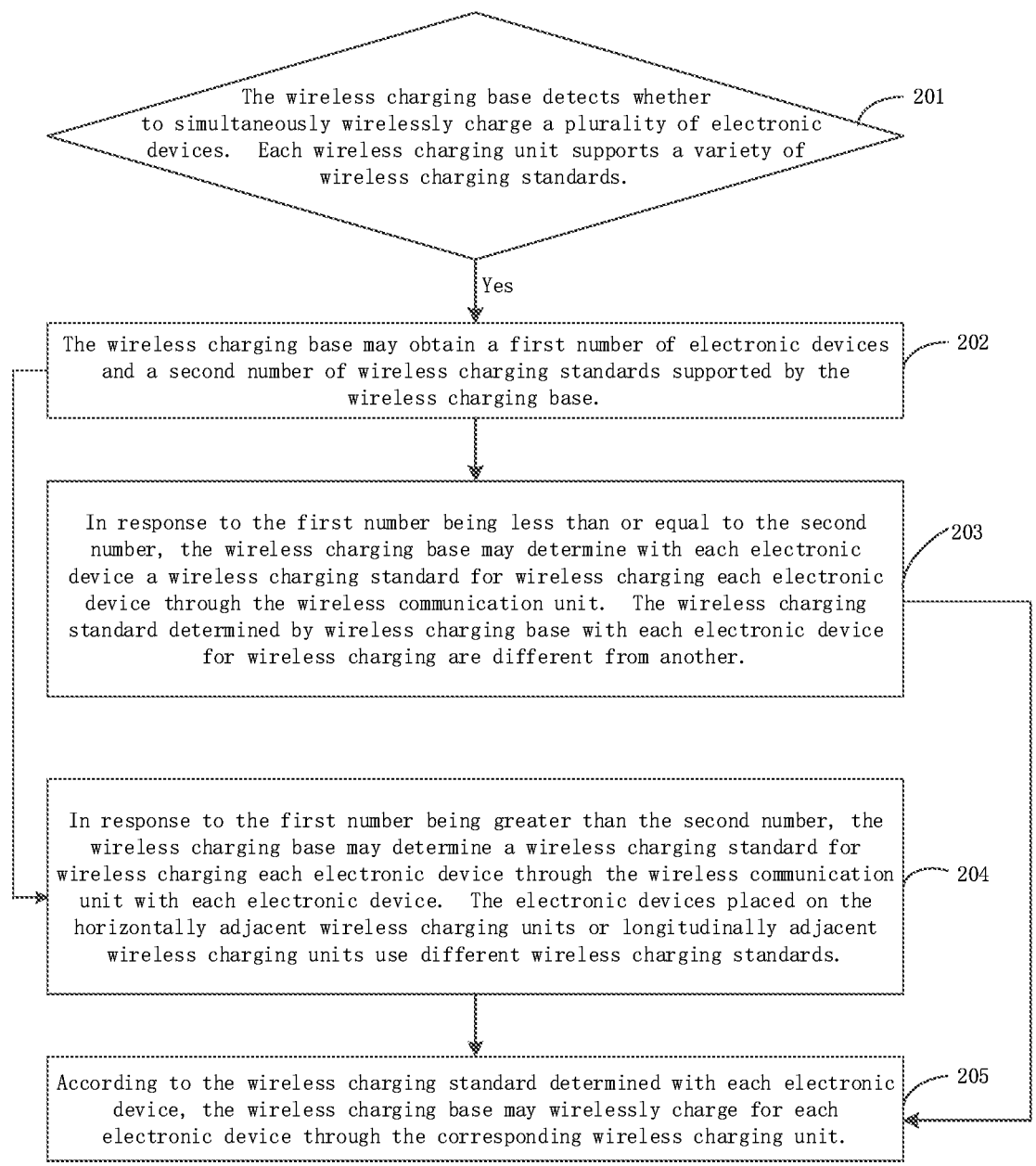
FIG. 2 is another flow chart of a charging control method according to some embodiments of the present disclosure.

Please referring to FIG. 2, FIG. 2 is another flow chart of a charging control method according to some embodiments of the present disclosure. The wireless charging method can be applied to the wireless charging base.

Figure 3:
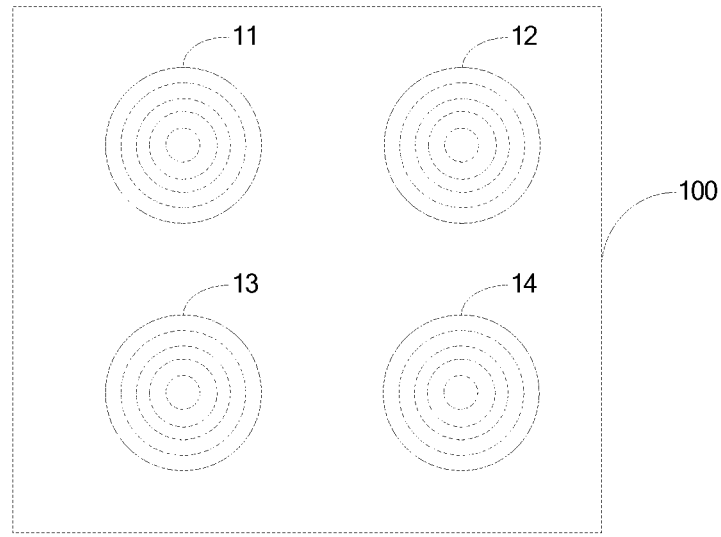
FIG. 3 is a structural schematic view of a wireless charging base according to some embodiments of the present disclosure.

The wireless charging base 100 may include a plurality of wireless charging units. For example, referring to FIG. 3, the wireless charging base may include four wireless charging units, that is, a wireless charging unit 11, a wireless charging unit 12, a wireless charging unit 13 and a wireless charging unit 14. Each wireless charging unit may support a variety of wireless charging standards, and each wireless charging unit can wirelessly charge electronic devices. As shown in FIG. 3, the four wireless charging units on the wireless charging base can be distributed in matrix form.

It should be noted that in one embodiment, Qi wireless charging standard (WPC wireless charging standard) and PMA wireless charging standard may use different frequency bands. Thus, the transmitting coil in the wireless charging unit can change the operating frequency band to support different standards. The WPC wireless charging standard may use the frequency band in the range of 105 to 205 kHz. The PMA wireless charging standard may use the frequency band in the range of 227 to 278 kHz. The wireless charging unit may include a transmitting coil, a circuit unit and a controller. The transmitting coil, the circuit unit and the controller can be electrically connected in turn. The components of a plurality of capacitors in the circuit unit may be used to change the operating frequency band without changing the transmitting coil. For example, when the WPC wireless charging standard is needed, the controller can change the electrical connection of the plurality of capacitors in the circuit unit so that the components of the plurality of capacitors are 200 nf. Thus, the transmitting coil can work in the frequency band of WPC wireless charging standard. When PMA communication standard is needed, the controller can change the electrical connection of the plurality of capacitors in the circuit unit so that the components of the plurality of capacitors are 55 nf. Thus, the transmitting coil can work in the frequency band of PMA wireless charging standard.

Alternatively, in another embodiment, the transmitting coil in each wireless charging unit on the wireless charging base can be selectively connected with a plurality of groups of charging working circuits. For example, the wireless charging unit may support Qi wireless charging standard and PMA wireless charging standard. Then, the wireless charging unit may include two groups of charging working circuits, such as the first charging working circuit and the second charging working circuit. The first charging working circuit may be the circuit supporting Qi wireless charging standard, and the second charging working circuit ma be the circuit supporting PMA wireless charging standard. When the Qi wireless charging standard is needed to work, the transmitting coil of the wireless charging unit can be connected with the first charging working circuit. When PMA wireless charging standard is needed to work, the transmitting coil of wireless charging unit can be connected with the second charging working circuit.

In addition, the wireless charging base 100 may also include a wireless communication unit (not shown in FIGS.). In some embodiments, the wireless communication unit may be a Bluetooth communication unit or an NFC communication unit, etc. Take the wireless communication unit as Bluetooth communication unit as an example. The wireless charging base can receive the Bluetooth connection information transmitted by the electronic device through the induction magnetic field between the wireless charging unit and the electronic device. Then, through the Bluetooth communication unit, the wireless charging base can pair with the electronic device according to the Bluetooth connection information of the electronic device, and establish the Bluetooth communication connection with the electronic device.

Before pairing with the electronic device according to the received Bluetooth connection information, the wireless charging device can judge whether a pairing relationship has been established with the electronic device according to the Bluetooth connection information. If the pairing relationship is not established, the wireless charging base will pair with the electronic device according to the Bluetooth connection information to establish the Bluetooth communication connection with the electronic device. If a pairing relationship has been established, the pairing will not be performed again, and the Bluetooth communication connection with the electronic device will be established directly.

The flow of the charging control method provided by the embodiment can include operations at blocks.

At block 201, the wireless charging base detects whether to simultaneously wirelessly charge a plurality of electronic devices. Each wireless charging unit supports a variety of wireless charging standards.

For example, the wireless charging base can detect whether wireless charging is required for the plurality of (at least two) electronic devices at the same time. The electronic device provided by the embodiments can support a variety of wireless charging standards. Moreover, each wireless charging unit in the wireless charging base provided by the embodiments may also support a variety of wireless charging standards.

In response to detecting that the wireless charging base is currently wirelessly charging only one electronic device, the wireless charging base can perform other operations.

In response to detecting that the wireless charging base currently needs to simultaneously wirelessly charge at least two electronic devices, enter the operations at block 202.

At block 202, in response to detecting that the wireless charging base simultaneously wirelessly charges the plurality of electronic devices, the wireless charging base may obtain a first number of electronic devices and a second number of wireless charging standards supported by the wireless charging base.

For example, in response to the wireless charging base detecting that the plurality of electronic devices are currently needed to be wirelessly charge at the same time, the wireless charging base can be triggered to obtain the number of electronic devices placed on the wireless charging base for charging, that is, the first number. Moreover, the wireless charging base can also obtain the number of wireless charging standards supported by the wireless charging base, that is, the second number.

For example, in the present embodiment, the wireless charging base may detect that two electronic devices are currently needed to be wirelessly charged at the same time. Besides, the wireless charging base supports two wireless charging standards. That is, the first number may be two, and the second number may be two.

It should be noted that in the embodiment, the number of wireless charging standards supported by each wireless charging unit may be equal to the number of wireless charging standards supported by the wireless charging base. For example, in response to the wireless charging base supporting two wireless charging standards, each wireless charging unit may also support two wireless charging standards.

After that, the wireless charging base can determine a wireless charging standard for wireless charging with each electronic device according to the first number and the second number.

For example, the wireless charging base can first compare the first number and the second number mentioned above.

In response to detecting that the first number being less than or equal to the second number, enter the operations at block 203.

In response to detecting that the first number is greater than the second number, enter the operations at block 204.

At block 203, in response to the first number being less than or equal to the second number, the wireless charging base may determine with each electronic device a wireless charging standard for wireless charging each electronic device through the wireless communication unit. The wireless charging standard determined by wireless charging base with each electronic device for wireless charging are different from another.

For example, after obtaining the first number of electronic devices placed on the wireless charging base for charging and the second number of wireless charging standards supported by the wireless charging base, the wireless charging base may detect that the first number is less than or equal to the second number. For example, the first number may be two, and the second number may be two. That is, there may be two electronic devices placed on the wireless charging base for wireless charging currently. The wireless charging base may support two wireless charging standards. Then, the wireless charging base can determine the wireless charging standard for wireless charging the electronic device through wireless communication unit and each electronic device. The wireless charging standards determined by the wireless charging base and the plurality of electronic devices are different from each other.

For example, the electronic devices placed on the wireless charging base for wireless charging are electronic devices A and B respectively. Each wireless charging unit on the wireless charging base supports two wireless charging standards, such as Qi standard (WPC standard) and PMA standard. That is, the first number and the second number may be both 2. Under these circumstances, the wireless charging base may determine with the electronic device A a first wireless charging standard for wireless charging the electronic device A, and determine with electronic device B a second wireless charging standard for wireless charging the electronic device B. The first wireless charging standard may be different from the second wireless charging standard.

For example, the wireless charging base may determine to use Qi standard for wireless charging of electronic device A and PMA standard for wireless charging of electronic device B. After that, enter the operations at block 205.

It should be noted that different wireless charging standards may use different frequency bands. For example, the WPC wireless charging standard may use the frequency band in the range of 105-205 kHz. The PMA wireless charging standard may use the frequency band in the range of 227-278 kHz. Therefore, when the plurality of electronic devices placed on the same wireless charging base for wireless charging are charged according to different wireless charging standards, the electromagnetic interference between different wireless charging units and different electronic devices may be small. Therefore, the electromagnetic interference between devices during wireless charging can also be reduced, and the stability and efficiency of wireless charging can be improved according to the embodiments.

At block 204, in response to the first number being greater than the second number, the wireless charging base may determine a wireless charging standard for wireless charging each electronic device through the wireless communication unit with each electronic device. The electronic devices placed on the horizontally adjacent wireless charging units or longitudinally adjacent wireless charging units use different wireless charging standards.

For example, after obtaining the first number of electronic devices placed on the wireless charging base for charging and the second number of wireless charging standards supported by the wireless charging base, the wireless charging base may detecting that the first number is greater than the second number. For example, the first number may be four and the second number may be two. That is, there may be currently four electronic devices placed on the wireless charging base for charging, and the wireless charging base may support two wireless charging standards. Then, the wireless charging base can determine the wireless charging standard for wireless charging with each electronic device. Different wireless charging standards may be used for the electronic devices placed on the horizontally adjacent wireless charging units or the longitudinally adjacent wireless charging units.

It should be noted that the horizontally adjacent wireless charging units refer to the adjacent wireless charging units in the same row, and the longitudinally adjacent wireless charging units refer to the adjacent wireless charging units in the same column. For example, as shown in FIG. 3, the wireless charging unit 11 and the wireless charging unit 12 may be horizontally adjacent wireless charging units, the wireless charging unit 11 and the wireless charging unit 13 may be longitudinally adjacent wireless charging units, the wireless charging unit 13 and the wireless charging unit 14 may be horizontally adjacent wireless charging units, and the wireless charging unit 12 and the wireless charging unit 14 may be longitudinally adjacent wireless charging units. The wireless charging unit 11 and the wireless charging unit 14 may be neither horizontally nor vertically adjacent.

Figure 4:
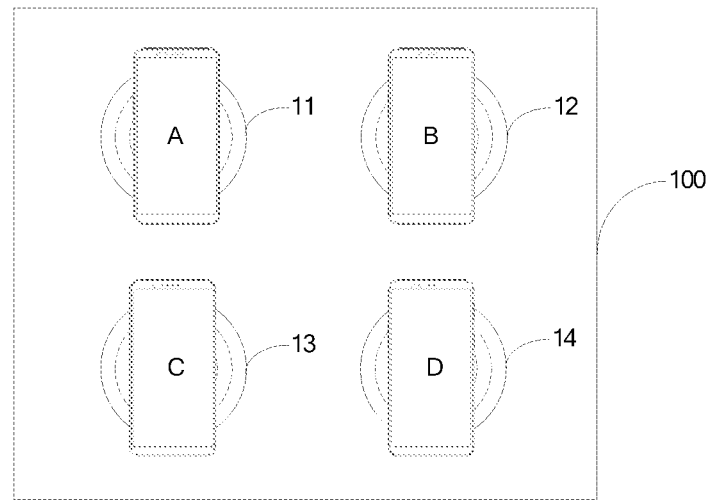
FIG. 4 is a scenario diagram of a charging control method according to some embodiments of the present disclosure.

For example, as shown in FIG. 4, the wireless charging unit 11, the wireless charging unit 12, the wireless charging unit 13 and the wireless charging unit 14 on the wireless charging base may be respectively placed with electronic devices A, B, C and D for wireless charging. Under these circumstances, the wireless charging base with the electronic devices A, B, C and D can determine the wireless charging standards for charging the electronic devices A, B, C and D respectively. Different wireless charging standards may be used for the electronic devices placed on the horizontally adjacent wireless charging units or longitudinally adjacent wireless charging units. For example, electronic device A may use Qi standard for wireless charging, electronic device B may use PMA standard for wireless charging, electronic device C may use PMA standard for wireless charging, and electronic device D may use Qi standard for wireless charging.

It can be understood that the distance between horizontally adjacent wireless charging units and longitudinally adjacent wireless charging units may be relatively close. The electromagnetic interference between different wireless charging units may be reduced by using different wireless charging standards for electronic devices placed on the horizontally adjacent or longitudinally adjacent wireless charging units according to the embodiment.

At block 205, according to the wireless charging standard determined with each electronic device, the wireless charging base may wirelessly charge for each electronic device through the corresponding wireless charging unit.

For example, after determining the wireless charging standard for wireless charging of the electronic device placed on the wireless charging base with each electronic device, the wireless charging base can wirelessly charge each electronic device through the corresponding wireless charging unit according to the wireless charging standard determined with each electronic device.

In one embodiment, after the operations of wireless charging for each electronic device through the corresponding wireless charging unit according to the wireless charging standard determined with each electronic device, the embodiment can also include the following operations.

In response to detecting a decrease in the number of electronic devices placed on the wireless charging base for charging, the wireless charging base obtains the third number of the target electronic devices currently placed on the wireless charging base for charging.

In response to the third number being less than or equal to the second number, the wireless charging standard for wireless charging each target electronic device may be determined by the wireless charging base with each target electronic device. The wireless charging standard determined by the wireless charging base and each target electronic device may be different from another.

For example, the user may pick up some electronic devices previously placed on the wireless charging base for charging, so that the number of the electronic devices placed on the wireless charging base for charging may be reduced from the first number to the third number and the third number may be less than or equal to the second number (that is, the number of wireless charging standards supported by the wireless charging base). In this case, the wireless charging base can determine a wireless charging standard for wireless charging each target electronic device with each target electronic device still placed on the wireless charging base for charging. The wireless charging standard determined by the wireless charging base and each target electronic device may be different from another.

In one embodiment, in response to detecting that the third number being greater than the second number, the wireless charging base may not change the wireless charging standard used by each target electronic device still placed on the wireless charging base for charging. In other words, the wireless charging base can still charge the electronic device still placed on the wireless charging base through the corresponding wireless charging unit according to the wireless charging standard previously determined with each electronic device.

Figure 5:
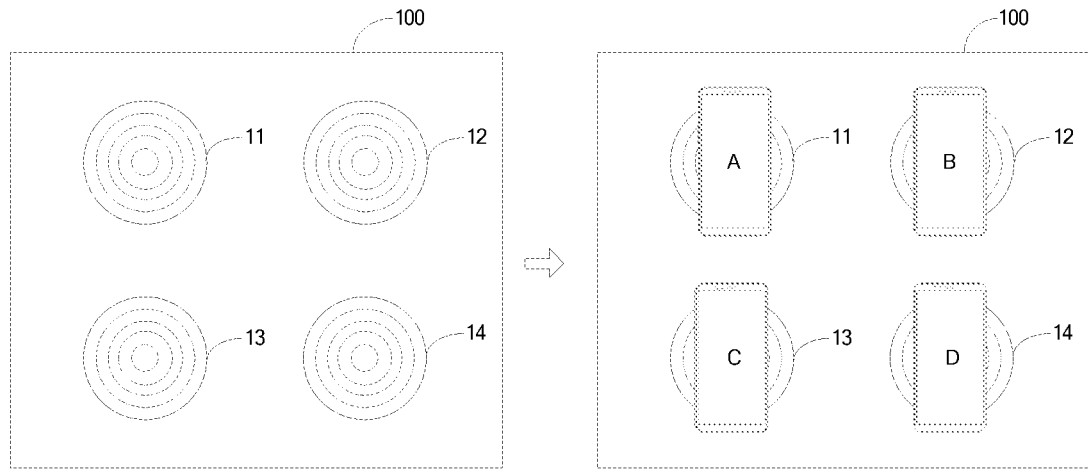
FIGS. 5 and 6 are other scenario diagrams of a charging control method according to some embodiments of the present disclosure.
Figure 6:
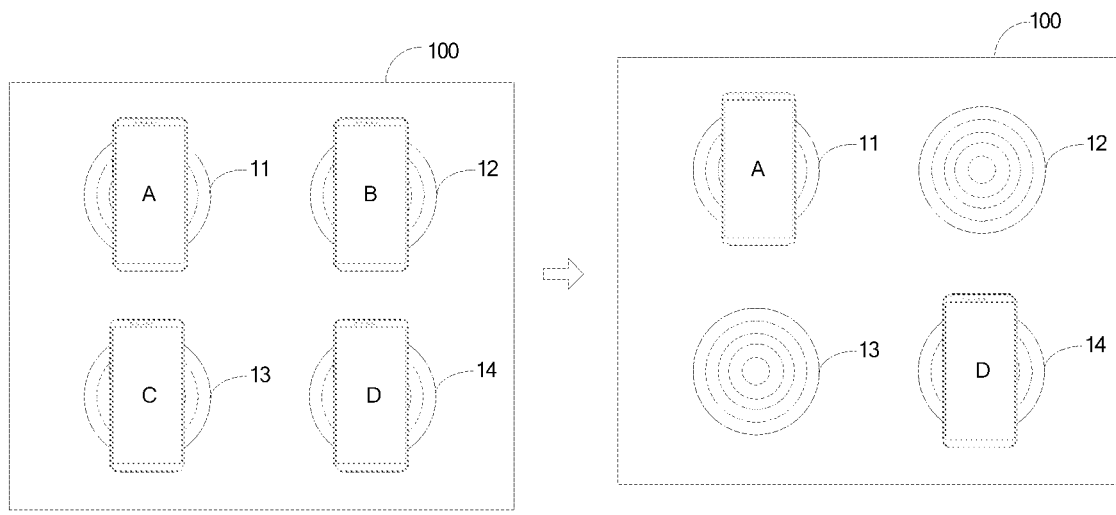

Please referring to FIGS. 5 to 6, FIGS. 5 to 6 are other scenario diagrams of a charging control method according to some embodiments of the present disclosure.

For example, the wireless charging base 100 may include four wireless charging units, that is a wireless charging unit 11, a wireless charging unit 12, a wireless charging unit 13 and a wireless charging unit 14. Each wireless charging unit may support Qi wireless charging standard and PMA wireless charging standard.

As shown in FIG. 5, the user may place the electronic devices A, B, C and D on the wireless charging units 11, 12, 13 and 14 of the wireless charging base 100 for wireless charging.

Under these circumstances, the wireless charging base can obtain a first number of electronic devices placed on the wireless charging base for charging and a second number of wireless charging standards supported by the wireless charging base. For example, the first number is 4 and the second number is 2.

After that, the wireless charging base can compare the first number and the second number. For example, the wireless charging base may detect that the first number is greater than the second number. In this case, the wireless charging base can determine the wireless charging standard for wireless charging with electronic devices A, B, C and D respectively. Different wireless charging standards may be used by the electronic devices placed on the horizontally adjacent wireless charging units or longitudinally adjacent wireless charging units.

For example, the wireless charging base and electronic device A may determine to use Qi standard to wirelessly charge the electronic device A. Wireless charging base and electronic device B may determine to use PMA standard to wirelessly charge the electronic device B. Wireless charging base and electronic device C may determine to use PMA standard to wirelessly charge the electronic device C. The wireless charging base and electronic device D may determine to use Qi standard to wirelessly charge the electronic device D.

After a period of time, the user picks up the electronic devices B and C from the wireless charging base, and no longer charges the electronic devices B and wirelessly C, as shown in FIG. 6. Under these circumstances, the wireless charging base can obtain the number of electronic devices still placed on the wireless charging base for charging, that is, the third number. Then, the wireless charging base can detect whether the third number is less than or equal to the second number.

For example, the third number is 2 (electronic devices A and D), and the second number is also 2, so the wireless charging base can detect that the third number is equal to the second number. In this case, the wireless charging base can determine a wireless charging standard for wireless charging with each target electronic device currently placed on the wireless charging base. The wireless charging standard determined by wireless charging base and each target electronic device may be different from another. For example, since only electronic devices A and D are charging on the wireless charging base currently, the wireless charging base can determine with electronic device A to use Qi wireless charging standard to charge electronic device A, and determine with electronic device D to use PMA wireless charging standard to charge electronic device D. That is, the wireless charging base can charge the electronic device D according to PMA wireless charging standard, instead of charging the electronic device D according to the previous Qi wireless charging standard.

In another embodiment, in response to detecting that the number of electronic devices for charging placed on the wireless charging base is reduced from the first number to the third number, and the third number may be less than or equal to the second number, the wireless charging base may not change the wireless charging standards used by the electronic devices A and D for a preset period of time. At the same time, the wireless charging base may record the identification of the wireless charging unit which switches from the working state to the non-working state.

In response to only electronic devices A and D being placed on the wireless charging base for charging within the preset time, the wireless charging base can charge electronic devices A and D according to Qi wireless charging standard and PMA wireless charging standard respectively.

In response to the user placing the new electronic device on the wireless charging base for charging within the preset time. For example, in response to the user placing an electronic device E on the wireless charging unit 12 for charging, the wireless charging base can still charge the electronic device A and D according to the Qi wireless charging standard, and the wireless charging base can charge the electronic device E according to the PMA wireless charging standard.

Figure 7:
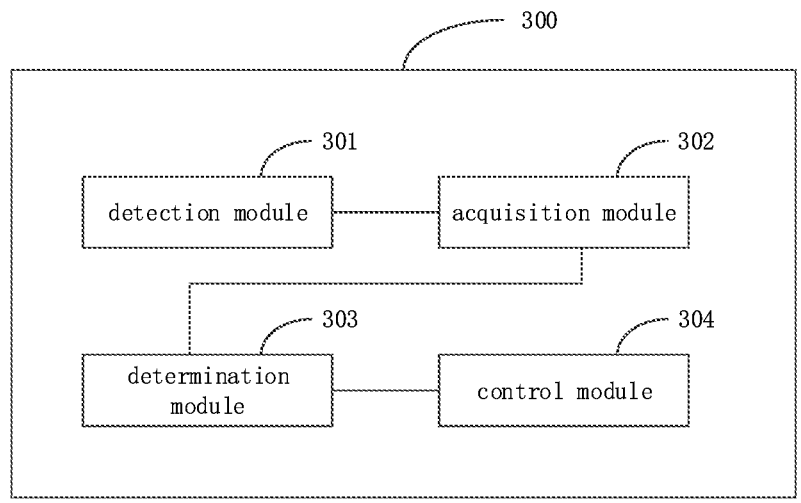
FIG. 7 is a structural schematic view of a charging device according to some embodiments of the present disclosure.

Please referring to FIG. 7, FIG. 7 is a structural schematic view of a charging device according to some embodiments of the present disclosure. The charging control device can be used in wireless charging base. The wireless charging base may include a plurality of wireless charging units. Each wireless charging unit may support a variety of wireless charging standards, and each wireless charging unit can wireless charge the plurality of electronic devices. The charging control device 300 may include a detection module 301, an acquisition module 302, a determination module 303, and a control module 304.

The detection module 301 may be configured to detect whether the wireless charging base simultaneously wirelessly charges the plurality of electronic devices, and each of the electronic devices may support a variety of wireless charging standards.

The acquisition module 302 may be configured to obtain a first number of electronic devices in response to detecting that the wireless charging base simultaneously wirelessly charges the plurality of electronic devices and a second number of wireless charging standards supported by the wireless charging base. The determination module 303 may be configured to determine wireless charging standard for wireless charging each electric device with each electric device according to the first number and the second number.

The control module 304 may be configured to wirelessly charge each electronic device through the corresponding wireless charging unit according to the wireless charging standard determined with each electronic device.

In one embodiment, the determination module 303 may be configured to determine the wireless charging standard for wireless charging the electronic device with each electronic device, in response to the first number being less than or equal to the second number. The wireless charging standard determined by wireless charging base and each electronic device may be different from another.

In one embodiment, the determination module 303 may be configured to determine with each electronic device the wireless charging standard for wireless charging the electronic device in response to the first number being greater than the second number. Different wireless charging standards may be used for the electronic devices placed on the horizontally adjacent wireless charging units or vertically adjacent wireless charging units.

In one embodiment, the wireless charging base may include a wireless communication unit, and the determination module 303 can be configured to determine a wireless charging standard for wireless charging with each electronic device through the wireless communication unit.

In one embodiment, the control module 304 can also be configured to perform the following operations.

In response to a decrease in the number of electronic devices placed on the wireless charging base for charging is detected, a third number of target electronic devices currently placed on the wireless charging base for wireless charging is obtained.

In response to the third number being less than or equal to the second number, the wireless charging standard for wireless charging is determined by each target electronic device, and the wireless charging standard for wireless charging the target electronic device determined by the wireless charging base and each target electronic device is different from another.

In one embodiment, the control module 304 can also be configured to change the wireless charging standard used by each target electronic device, in response to the third number being greater than the second number.

In some embodiments, the wireless communication unit may include a Bluetooth communication unit or an NFC communication unit.

The embodiment of the present disclosure provides a computer-readable storage medium. The computer-readable storage medium may store a computer program. When the computer program is executed on the computer, the computer is made to perform the operations in the charging control method provided in the embodiments.

The embodiment of the present disclosure also provides a wireless charging base. The wireless charging base may include a non-transitory storage medium and a processor. The processor may be configured to perform the operations in the charging control method provided by the embodiments by using the computer program stored in the non-transitory storage medium.

Figure 8:
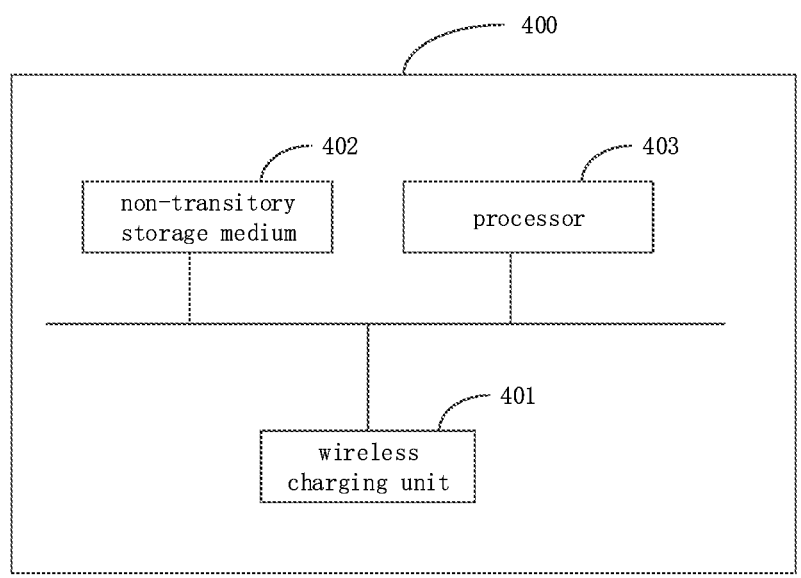
FIG. 8 is a structural schematic view of a wireless charging base according to some embodiments of the present disclosure.

Please referring to FIG. 8, FIG. 8 is a structural schematic view of a wireless charging base according to some embodiments of the present disclosure.

The wireless charging base 400 may include a wireless charging unit 401, a non-transitory storage medium 402, a processor 403 and the like. It can be understood by those skilled in the art that the wireless charging base structure shown in FIG. 8 does not limit the wireless charging base. The wireless charging base may include more or fewer components than those shown, or combine some components, or have different component arrangements.

The wireless charging unit 401 can support a variety of wireless charging standards, and each wireless charging unit 501 can wireless charge for electronic devices.

The non-transitory storage medium 402 may be configured to store application programs and data. The application programs stored in the non-transitory storage medium 402 contain executable code. The application programs can be composed of various functional modules. The processor 403 may be configured to perform various functional application and data processing by running the application programs stored in the non-transitory storage medium 402.

The processor 403 may be the control center of the wireless charging base, use various interfaces and lines to connect all parts of the wireless charging base. By running or executing the application programs stored in the non-transitory storage medium 402 and using the data stored in the non-transitory storage medium 402, the processor 403 may be configured to perform various functions and processing data of the wireless charging base to monitor the wireless charging base.

In the embodiment, the processor 403 in the wireless charging base will load the executable code corresponding to one or more application programs into the non-transitory storage medium 402 according to the following instructions, and the processor 403 will execute the application programs stored in the non-transitory storage medium 402 to realize the following operations.

Whether the wireless charging base wirelessly charge for a plurality of electronic devices at the same time is detected, and each electronic device may support a variety of wireless charging standards. If so, the first number of the electronic devices and the second number of the wireless charging standards supported by the wireless charging base are obtained. The device determines the wireless charging standards for wireless charging of the electronic device may be determined with each electronic device according to the first number and the second number. According to the wireless charging standards determined with each electronic device, each electronic device may be wirelessly charged through the corresponding wireless charging unit.

Figure 9:
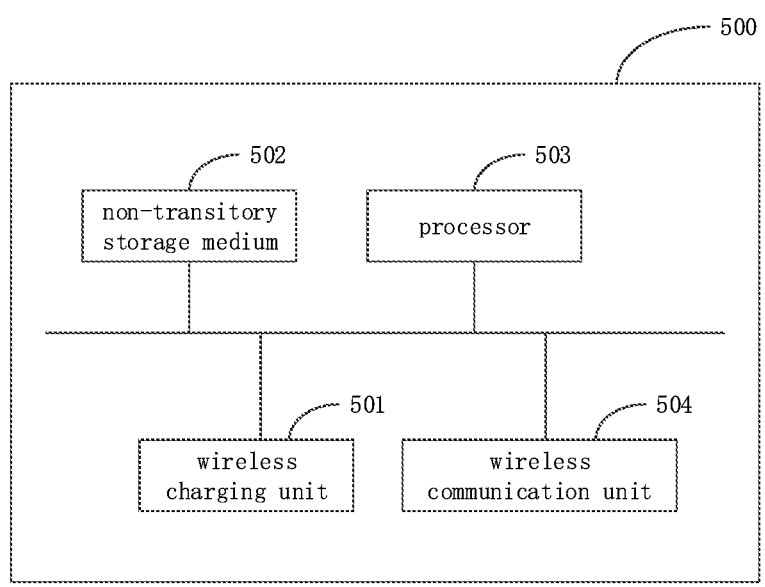
FIG. 9 is another structural diagram of a wireless charging base according to some embodiments of the present disclosure.

Referring to FIG. 9, the wireless charging base 500 may include a plurality of wireless charging units 501, a non-transitory storage medium 502, a processor 503, a wireless communication unit 504, and the like.

The wireless charging unit 501 can support a variety of wireless charging standards, and each wireless charging unit 501 can wirelessly charge for electronic devices.

The non-transitory storage medium 502 may be configured to store application programs and data. The application programs stored in the non-transitory storage medium 502 may contain executable code. The application programs can be composed of various functional modules. The processor 503 may be configured to perform various functional application and data processing by running the application programs stored in the non-transitory storage medium 502.

The processor 503 may be the control center of the wireless charging base, use various interfaces and lines to connect all parts of the wireless charging base. By running or executing the application programs stored in the non-transitory storage medium 502 and using the data stored in the non-transitory storage medium 502, the processor 503 may be configured to perform various functions and processing data of the wireless charging base to monitor the wireless charging base.

In the embodiment, the processor 503 in the wireless charging base will load the executable code corresponding to one or more application programs into the non-transitory storage medium 502 according to the following instructions, and the processor 503 will execute the application programs stored in the non-transitory storage medium 502 to realize the following operations.

Whether the wireless charging base wirelessly charge for a plurality of electronic devices at the same time is detected, and each electronic device may support a variety of wireless charging standards. If so, the first number of the electronic devices and the second number of the wireless charging standards supported by the wireless charging base may be obtained. The wireless charging standards for wireless charging of the electronic device are determined with each electronic device, according to the first number and the second number. According to the wireless charging standards determined with each electronic device, each electronic device may be wirelessly charged through the corresponding wireless charging unit.

In one embodiment, when the processor 503 performs the operations of determining the wireless charging standard for wireless charging thereof with each of the electronic devices according to the first number and the second number, the processor 503 may be configured to perform: in response to the first number being less than or equal to the second number, determining with each electronic device the wireless charging standard for wireless charging each electronic device. The wireless charging standard for wireless charging each electronic device determined by the wireless charging base with each electronic device may be different from another.

In one embodiment, the wireless charging units on the wireless charging base may be distributed in a matrix manner. When the processor 503 performs the operations of determining the wireless charging standard for wireless charging thereof with each of the electronic devices according to the first number and the second number, the processor 503 may be configured to perform: in response to the first number being greater than the second number, determining with each electronic device the wireless charging standard for wireless charging each electronic device. The electronic devices placed on the horizontally adjacent or longitudinally adjacent wireless charging units may use different wireless charging standards.

In one embodiment, the wireless charging base includes a wireless communication unit. when the processor 503 performs the operations of determining a wireless charging standard for wireless charging with each electronic device, the processor 503 may be configured to perform: determining the wireless charging standard for wireless charging the each electronic device through the wireless communication unit with each electronic device.

In one embodiment, after the operations of wireless charging each electronic device through the corresponding wireless charging unit according to the wireless charging standards determined with each electronic device, the processor 503 can also be configured to perform: in response to the number of electronic devices placed on the wireless charging base for charging being detected to be reduced, obtaining a third number of target electronic devices currently placed on the wireless charging base for charging. In response to the third number being less than or equal to the second number, the wireless charging standard for wireless charging may be determined with each target electronic device. The wireless charging standards for wireless charging each target electronic device determined by the wireless charging base and each target electronic device may be different from another.

In one embodiment, processor 503 may also be configured to perform: in response to the third number being greater than the second number, maintaining the wireless charging standard used by each of the target electronic devices.

In some embodiments, the wireless communication unit may include a Bluetooth communication unit or an NFC communication unit.

In the above embodiments, the description of each embodiment has its own emphasis. For the part not detailed in one embodiment, please refer to the detailed description of charging control method above. It will not repeat here.

The charging control device provided by the embodiment of the present disclosure and the charging control method in the above embodiment belong to the same concept. The charging control method provided by any embodiment can be operated on the charging control device. The specific implementation process is described in the charging control method embodiments, and will not be repeated here.

It should be noted that for the charging control method described in the embodiments of the present disclosure, These skilled in the art can understand that all or part of the process of realizing the charging control method described in the embodiments of the present disclosure can be completed by controlling the relevant hardware through a computer program, and the computer program can be stored in a computer readable storage medium, such as a non-transitory storage medium. The computer program may be executed by at least one processor, during executing the computer program, the process of the embodiment of the charging control method can be included. The storage medium can be disk, optical disc, read only memory (ROM), random access memory (RAM), etc.

For the charging control device according to the embodiment of the present disclosure, each functional module can be integrated in a processing chip, or each module can be an independent physical existence, or two or more modules can be integrated in one module. The above integrated modules can be implemented in the form of hardware or software function modules. If the integrated module is realized in the form of software function module and sold or used as an independent product, it can also be stored in a computer readable storage medium, such as read-only memory, disk or optical disk, etc.

A method device for charging control, a storage device and an electronic device provided by the embodiment of the present disclosure are described in detail. In the description, specific examples are applied to explain the principle and embodiments of the invention. The description of the above embodiments is only used to help understand the method and core idea of the invention. Meanwhile, for those skilled in the art, according to the idea of the invention the specific implementations and application scope will be changed. In summary, the contents of the specification should not be interpreted as the limitation of the invention.

What is claimed is:

1. A charging control method applied to a wireless charging base, wherein the wireless charging base comprises a plurality of wireless charging units, each wireless charging unit supports a variety of wireless charging standards, and each wireless charging unit wirelessly charges for electronic devices, and the method comprises:

detecting whether the wireless charging base simultaneously wirelessly charging a plurality of electronic devices, wherein each wireless charging unit supports a variety of wireless charging standards;

in response to detecting that the wireless charging base simultaneously wirelessly charges the plurality of electronic devices, obtaining a first number of electronic devices and a second number of wireless charging standards supported by the wireless charging base;

determining the wireless charging standards supported by each electronic device;

determining with each electronic device a wireless charging standard for wireless charging each electronic device according to the first number and the second number; and wirelessly charging each electronic device through corresponding wireless charging unit according to the wireless charging standard determined with each electronic device.

2. The charging control method according to claim 1, wherein determining with each electronic device the wireless charging standard for wireless charging each electronic device according to the first number and the second number comprises:

in response to the first number being less than or equal to the second number, determining with each electronic device a wireless charging standard for wireless charging each electronic device, wherein the wireless charging standard for wireless charging each electronic device determined with each electronic device is different from another.

3. The charging control method according to claim 2, wherein the wireless charging units on the wireless charging base are distributed in matrix form; and determining with each electronic device the wireless charging standard for wireless charging each electronic device according to the first number and the second number comprises:

in response to the first number being greater than the second number, determining with each electronic device the wireless charging standard for wireless charging each electronic device, wherein the electronic devices placed on horizontally adjacent wireless charging units or longitudinally adjacent wireless charging units use different wireless charging standards.

4. The charging control method according to claim 1, wherein the wireless charging base comprises a wireless communication unit; and determining with each electronic device the wireless charging standard for wireless charging each electronic device comprises determining the wireless charging standard for wireless charging each electronic device through the wireless communication unit with each electronic device.

5. The charging control method according to claim 3, wherein after the step of wirelessly charging each electronic device through corresponding wireless charging unit according to the wireless charging standard determined with each electronic device, the method further comprises:

in response to detecting a decrease in the number of the electronic devices placed on the wireless charging base for charging, obtaining a third number of target electronic devices currently placed on the wireless charging base for charging; and in response to the third number being less than or equal to the second number, determining with each target electronic device the wireless charging standard for wireless charging each target electronic device, wherein the wireless charging standard for wireless charging each target electronic device determined with each target electronic device is different from another.

6. The charging control method according to claim 5, wherein the method further comprises:

in response to the third number being greater than the second number, maintaining the wireless charging standard used by each target electronic device.

7. The charging control method according to claim 4, wherein the wireless communication unit comprises a Bluetooth communication unit or an NFC communication unit.

8. A charging control device applied to a wireless charging base, wherein the wireless charging base comprises a plurality of wireless charging units, each wireless charging unit supports a variety of wireless charging standards, and each wireless charging unit wireless charges for electronic devices, and the device comprises:

a detection module configured to detect whether the wireless charging base simultaneously charging a plurality of electronic devices, wherein each electronic device supports a variety of wireless charging standards;

an acquisition module configured to obtain a first number of electronic devices and a second number of wireless charging standards supported by the wireless charging base, in response to detecting the wireless charging base simultaneously charging the plurality of electronic devices;

a determination module configured to determine the wireless charging standards supported by each electronic device, and determine with each electronic device a wireless charging standard for wireless charging each electronic device according to the first number and the second number; and a control module configured to wirelessly charge each electronic device through corresponding wireless charging unit according to the wireless charging standard determined with each electronic device.

9. The charging control device according to claim 8, wherein the determination module is configured to determine with each electronic device the wireless charging standard for wireless charging each electronic device in response to the first number being less than or equal to the second number, and the wireless charging standard for wireless charging each electronic device determined with each electronic device is different from another.

10. The charging control device according to claim 8, wherein the wireless charging units on the wireless charging base are distributed in matrix form, the determination module is configured to determine with each electronic device the wireless charging standard for wireless charging each electronic device in response to the first number being greater than the second number, and the electronic devices placed on horizontally adjacent wireless charging units or longitudinally adjacent wireless charging units use different wireless charging standards.

11. The charging control device according to claim 8, wherein the wireless charging base comprises a wireless communication unit, the determination module is configured to determine the wireless charging standard for wireless charging each electronic device through the wireless communication unit with each electronic device.

12. The charging control device according to claim 10, wherein the control module is configured that in response to detecting a decrease in the number of the electronic devices placed on the wireless charging base for charging, a third number of target electronic devices currently placed on the wireless charging base for charging is obtained; and in response to the third number being less than or equal to the second number, the wireless charging standard for wireless charging each target electronic device is determined with each target electronic device, wherein the wireless charging standard for wireless charging each target electronic device determined with each target electronic device is different from another.

13. The charging control device according to claim 12, wherein the control module configured to not change the wireless charging standard used by each target electronic device in response to the third number being greater than the second number.

14. A wireless charging base comprises a non-transitory storage medium and a processor, wherein the wireless charging base comprises a plurality of wireless charging units, each wireless charging unit supports a variety of wireless charging standards, and each wireless charging unit wireless charges for electronic devices, and the processor is configured to use computer programs stored in the non-transitory storage medium to perform:

detecting whether the wireless charging base simultaneously wirelessly charging a plurality of electronic devices, wherein electronic device supports a variety of wireless charging standards;

in response to detecting that the wireless charging base simultaneously wirelessly charges the plurality of electronic devices, obtaining a first number of electronic devices and a second number of wireless charging standards supported by the wireless charging base;

determining the wireless charging standards supported by each electronic device;

determining with each electronic device a wireless charging standard for wireless charging each electronic device according to the first number and the second number; and wirelessly charging each electronic device through corresponding wireless charging unit according to the wireless charging standard determined with each electronic device.

15. The wireless charging base according to claim 14, wherein the processor is configured to perform:

in response to the first number being less than or equal to the second number, determining with each electronic device a wireless charging standard for wireless charging each electronic device, and the wireless charging standard for wireless charging each electronic device determined with each electronic device is different from another.

16. The wireless charging base according to claim 14, wherein the wireless charging units on the wireless charging base are distributed in matrix form; and the processor is configured to perform: in response to the first number being greater than the second number, determining with each electronic device the wireless charging standard for wireless charging each electronic device, wherein the electronic devices placed on horizontally adjacent wireless charging units or longitudinally adjacent wireless charging units use different wireless charging standards.

17. The wireless charging base according to claim 14, wherein the wireless charging base comprises a wireless communication unit; and the processor is configured to perform: determining the wireless charging standard for wireless charging each electronic device through the wireless communication unit with each electronic device.

18. The wireless charging base according to claim 16, wherein the processor is configured to perform:

in response to detecting a decrease in the number of the electronic devices placed on the wireless charging base for charging, obtaining a third number of target electronic devices currently placed on the wireless charging base for charging; and in response to the third number being less than or equal to the second number, determining with each target electronic device the wireless charging standard for wireless charging each target electronic device, wherein the wireless charging standard for wireless charging each target electronic device determined with each target electronic device is different from another.

19. The wireless charging base according to claim 18, wherein the processor is further configured that in response to the third number being greater than the second number, the wireless charging standard used by each target electronic device is not changed.

20. The wireless charging base according to claim 17, wherein the wireless communication unit comprises a Bluetooth communication unit or an NFC communication unit.

* * * * *